United States Patent
Tanigawa et al.

(10) Patent No.: US 9,400,946 B2
(45) Date of Patent: Jul. 26, 2016

(54) IMAGE FORMING APPARATUS WITH CODE IMAGE POSITION DETERMINATION

(71) Applicant: FUJI XEROX CO., LTD., Tokyo (JP)

(72) Inventors: Tomohiro Tanigawa, Kanagawa (JP); Kosuke Kubota, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/539,455

(22) Filed: Nov. 12, 2014

(65) Prior Publication Data

US 2015/0371116 A1    Dec. 24, 2015

(30) Foreign Application Priority Data

Jun. 18, 2014  (JP) .................................. 2014-125699

(51) Int. Cl.
  *G06K 15/00* (2006.01)
  *G06K 15/02* (2006.01)

(52) U.S. Cl.
  CPC .................................. *G06K 15/027* (2013.01)

(58) Field of Classification Search
  None
  See application file for complete search history.

(56) References Cited

U.S. PATENT DOCUMENTS

| 8,953,215 B2* | 2/2015 | Goto | H04N 1/2323 348/36 |
| 2005/0226534 A1* | 10/2005 | Moroo | G06T 7/0042 382/291 |
| 2007/0177220 A1 | 8/2007 | Hatano | |
| 2008/0151280 A1* | 6/2008 | Kamijo | H04N 1/00002 358/1.9 |
| 2009/0033957 A1* | 2/2009 | Hardy | H04N 1/6033 358/1.9 |
| 2012/0147074 A1* | 6/2012 | Ikeda | B41J 3/28 347/8 |

FOREIGN PATENT DOCUMENTS

| JP | H11-069138 A | 3/1999 |
| JP | 2007-194938 A | 8/2007 |

* cited by examiner

*Primary Examiner* — Miya J Cato
(74) *Attorney, Agent, or Firm* — Oliff PLC (57) ABSTRACT

Provided is an image forming apparatus, including an image forming unit that forms a test image for correction of a position of an image on the recording medium, a reading unit that reads an image from the recording medium on which the test image is formed, a transport unit that transports the recording medium, and a correction unit that corrects the position of the image, wherein the test image includes a first mark that is provided at a distance determined from the first reference line, a second mark that is provided at the distance from a second reference line set with respect to a second side, and a code image that is provided at a position determined with respect to the first mark and the second mark, and that indicates information for correction of the position of the image by the correction unit.

9 Claims, 6 Drawing Sheets

IMAGE FORMING APPARATUS WITH CODE IMAGE POSITION DETERMINATION

CROSS-REFERENCE TO RELATED APPLICATIONS

This application is based on and claims priority under 35 USC 119 from Japanese Patent Application No. 2014-125699 filed Jun. 18, 2014.

BACKGROUND

Technical Field

The present invention relates to an image forming apparatus.

SUMMARY

According to an aspect of the invention, there is provided an image forming apparatus, including:

an image forming unit that forms a test image for correction of a position of an image, which is formed on a recording medium, on the recording medium;

a reading unit that reads an image from the recording medium on which the test image is formed;

a transport unit that transports the recording medium, on which the test image is formed, with respect to the reading unit in order for a first reference line set with respect to the recording medium to be read at a specific position in the reading unit; and a correction unit that corrects the position of the image, which is formed on the recording medium by the image forming unit, using an image that is read by the reading unit, wherein the test image includes:

a first mark that is provided at a distance determined from the first reference line in correspondence with a first side of the recording medium;

a second mark that is provided at the distance from a second reference line set with respect to a second side in correspondence with the second side that comes into contact with the first side; and a code image that is provided at a position determined with respect to the first mark and the second mark, and that indicates information for correction of the position of the image by the correction unit.

BRIEF DESCRIPTION OF THE DRAWINGS

Exemplary embodiments of the present invention will be described in detail based on the following figures, wherein.

DETAILED DESCRIPTION

Figure 1:
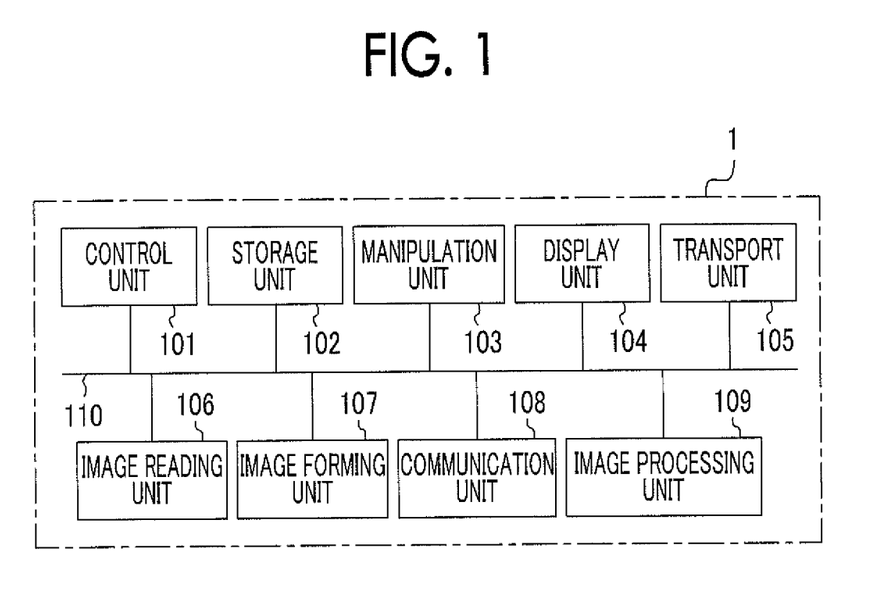
FIG. 1 is a block diagram illustrating a hardware configuration of an image forming apparatus.

FIG. 1 is a block diagram illustrating a hardware configuration of an image forming apparatus 1. The image forming apparatus 1 is an information processing apparatus that functions as a copying machine, a printer, a scanner, and a facsimile. As shown in the same drawing, the image forming apparatus 1 includes a control unit 101, a storage unit 102, a manipulation unit 103, a display unit 104, a transport unit 105, an image reading unit 106, an image forming unit 107, a communication unit 108, and an image processing unit 109. In addition, respective units of the image forming apparatus 1 are connected to a bus 110, and transmission and reception of data are performed through the bus 110.

The control unit 101 is a unit that controls operations of the respective units of the image forming apparatus 1. The control unit 101 includes an arithmetic processing unit such as a central processing unit (CPU), and a storage medium (main storage unit) such as a read only memory (ROM) and a random access memory (RAM). The CPU reads a program stored in the ROM and the storage unit 102 and executes the program with the RAM set as a working area. The control unit 101 executes the program in this manner, thereby realizing formation of an image on paper (example of the recording medium), reading an image from paper and generation of image data, communication with other apparatuses through a communication line, and the like.

The storage unit 102 is a unit that stores data. The storage unit 102 includes a storage medium (auxiliary storage device) such as a hard disk and a flash memory, and stores data received by the communication unit 108, data generated in the image forming apparatus 1, and the like. In addition, the storage unit 102 may include a detachable storage medium (removable memory) such as a so-called memory card and a USB memory, and a unit that reads and writes data from and to the storage medium. The storage unit 102 stores a correction program to be described later.

The manipulation unit 103 is a unit that receives a manipulation of a user. The manipulation unit 103 includes manipulation elements (buttons, keys, and the like), and supplies control signals in accordance with the manipulation elements that are pressed to the control unit 101. In addition, the manipulation unit 103 includes the display unit 104 and a sensor that is provided to be overlapped on a display surface of the display unit 104, and may be constituted by a touch panel that supplies control signals in accordance with pressed positions to the control unit 101.

The display unit 104 is a unit that displays information. The display unit 104 includes, for example, a liquid crystal display as a display device. The display unit 104 displays a menu screen for manipulation of the image forming apparatus 1 under control of the control unit 101.

The transport unit 105 is a unit that transports paper to the image reading unit 106. The transport unit 105 includes various rolls that process paper placed on a paper tray sheet by sheet, and transport the paper to a region of platen glass in which the paper is read. The paper that is transported by the transport unit 105 is pressed onto the platen glass.

The image reading unit 106 is a unit that optically reads the paper and converts the resultant read image into image data. The image reading unit 106 includes a rod-shaped light source which extends in a main-scanning direction and irradiates a surface of the paper pressed onto the platen glass with light, an optical system which allows reflected light of the light emitted to the paper to propagate and forms an image, and an image sensor that performs photoelectric conversion of an optical image that is formed. The image reading unit 106 supplies the image data read from the paper to the image processing unit 109.

The image forming unit 107 is a unit that forms an image on the paper. The image forming unit 107 includes an image forming mechanism that forms a toner image on the paper by an electro-photographic method. In addition, in the image forming mechanism, other recording methods such as an ink jet method may be used without a limitation to the electro-photographic method.

The communication unit 108 is a unit that transmits and receives data. The communication unit 108 is connected to the communication line, and functions as a communication interface that performs communication with other devices that are connected to the communication line.

The image processing unit 109 is a unit that performs image processing with respect to the image data. The image processing stated here represents, for example, color correction or gradation correction. In a case where a print function is executed in the image forming apparatus 1, the image processing unit 109 supplies image data, which is subjected to the image processing, to the image forming unit 107.

When an image is formed on the paper by the image forming unit 107, positional deviation of the image (deviation of a relative positional relationship between the image and the paper from an ideal state) may occur in some cases. Therefore, the image forming apparatus 1 has a function (hereinafter, referred to as a "correction function") of correcting a position of the image that is formed on the paper. When the correction function is executed, an image (hereinafter, referred to as a "test image") for correction of the position of the image, which is formed on the paper, is formed on the paper by the image forming unit 107. A user places paper (hereinafter, referred to as "test paper"), on which the test image is formed, on a paper tray to allow the image reading unit 106 to read the test image. The image forming apparatus 1 corrects the position of the image, which is formed on the paper, by using an image (hereinafter, referred to as a "read image") that is read from the test paper. The test image includes an image (hereinafter, referred to as a "code image") including information that is used when the image forming apparatus 1 corrects the position of the image. In this case, the image forming apparatus 1 specifies a position of the code image by analyzing the read image, and acquires information by decoding the code image. Here, the position of the code image in the read image varies in accordance with a direction of the test paper that is placed on the paper tray. Therefore, the process of specifying the position of the code image included in the read image may be a burden on the image forming apparatus 1. The image forming apparatus 1 according to the exemplary embodiment of the invention makes it easy to specify the position of the code image regardless of the direction of the test paper that is read by the image reading unit 106.

Figure 2:
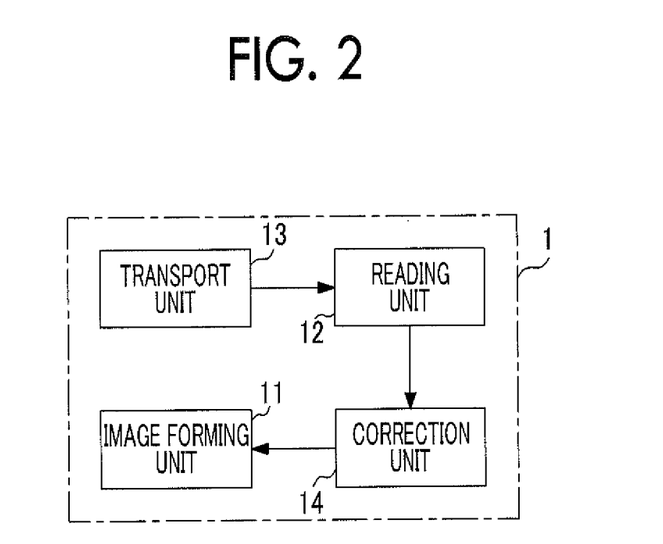
FIG. 2 is a block diagram illustrating a functional configuration of the image forming apparatus.

FIG. 2 is a block diagram illustrating a functional configuration of the image forming apparatus 1. The image forming apparatus 1 includes an image forming unit 11, a reading unit 12, a transport unit 13, and a correction unit 14. The image forming unit 11 forms a test image on paper. The reading unit 12 reads an image from the test paper. The transport unit 13 transports the test paper to the reading unit 12. The transport unit 13 transports the test paper in such a manner that the paper and the reading unit 12 have a positional relationship that is determined. Specifically, the transport unit 13 transports the test paper in such a manner that a reference line determined with respect to the paper passes through a point (hereinafter, referred to as a "reference point") that is determined in the reading unit 12. The correction unit 14 corrects a position of an image, which is formed on the paper by the image forming unit 11, by using the read image that is read by the reading unit 12.

In the image forming apparatus 1, the image forming unit 107, which is controlled by the control unit 101 that executes a correction program for realization of a correction function, is an example of the image forming unit 11. The image reading unit 106, which is controlled by the control unit 101 that executes the correction program, is an example of the reading unit 12. The transport unit 105, which is controlled by the control unit 101 that executes the correction program, is an example of the transport unit 13. The control unit 101, which executes the correction program, is an example of the correction unit 14.

Figure 3:
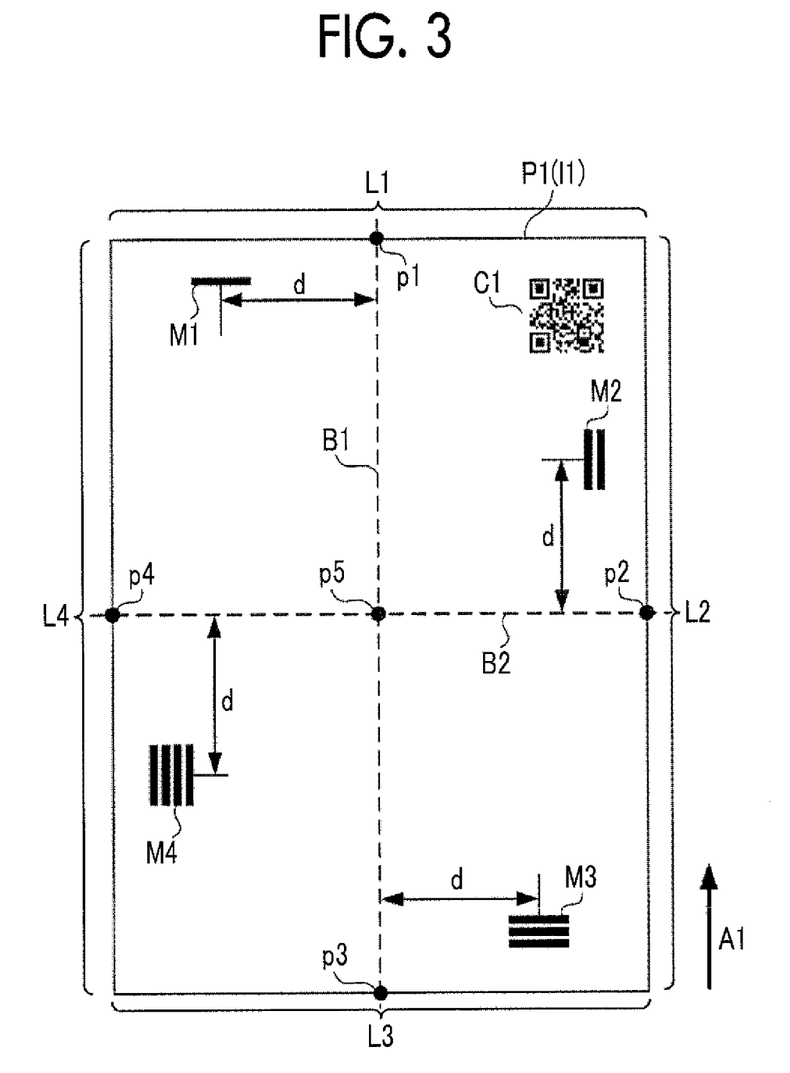
FIG. 3 is a view illustrating test paper.

FIG. 3 is a view illustrating test paper P1 that is used in the invention. In FIG. 3, as an example of the code image, a QR code (registered trademark) C1 is included in a test image I1. The QR code C1 includes information for identification of the QR code C1, information such as a paper size and a basis weight of the test paper P1 which indicates a kind of the test paper P1, or information indicating image forming conditions when the test image I1 is formed (for example, a correction value and the like in a case where a process of correcting the position of the test image I1 is performed). In addition, in this exemplary embodiment, character data is encoded in the QR code C1. In addition, the test image I1 includes four marks M (M1 to M4). The marks M are used to specify the position of the QR code. The marks M1 to M4 have shapes different from each other, and are provided in correspondence with sides of the test paper P1 which are different from each other. The mark M1 is constituted by one line segment and is provided in correspondence with a short side L1 of the test paper P1. The mark M2 is constituted by two line segments and is provided in correspondence with a long side L2 of the test paper P1. The mark M3 is constituted by three line segments and is provided in correspondence with a short side L3 of the test paper P1. The mark M4 is constituted by four line segments and is provided in correspondence with a long side L4 of the test paper P1. In the test image I1, the QR code C1 is provided at a position that is determined with respect to the marks M. In an example of FIG. 3, the QR code C1 is provided at a position that is determined with respect to the mark M1 and the mark M2. Specifically, the QR code C1 is provided at a position at which an extended line of the line segment of the mark M1 and an extended line of the line segment (here, in the two line segments that constitute the mark M2, a line segment on a side close to the long side L2) of the mark M2 intersect each other.

In FIG. 3, a broken line E1 and a broken line B2 are virtual straight lines that are set with respect to the test paper P1. The broken line B1 is a straight line that passes through the middle point p1 of the short side L1 and the middle point p3 of the short side L3. The broken line B2 is a straight line that passes through the middle point p2 of the long side L2 and the middle point p4 of the long side L4. A point p5 is a point at which the broken line B1 and the broken line B2 intersect each other. In addition, the middle points p1 to p4, and the point 5 are illustrated for convenience of explanation, and are not included in the test image I1. In this exemplary embodiment, the mark M1 and the mark M3 are provided at positions with a distance d that is determined from the broken line B1. The mark M1 and the mark M3 are provided at positions that are point-symmetric about the point p5. The mark M2 and the mark M4 are provided at positions with a distance d from the broken line B2. The mark M2 and the mark M4 are provided at positions that are point-symmetric about the point p5.

Figure 4:
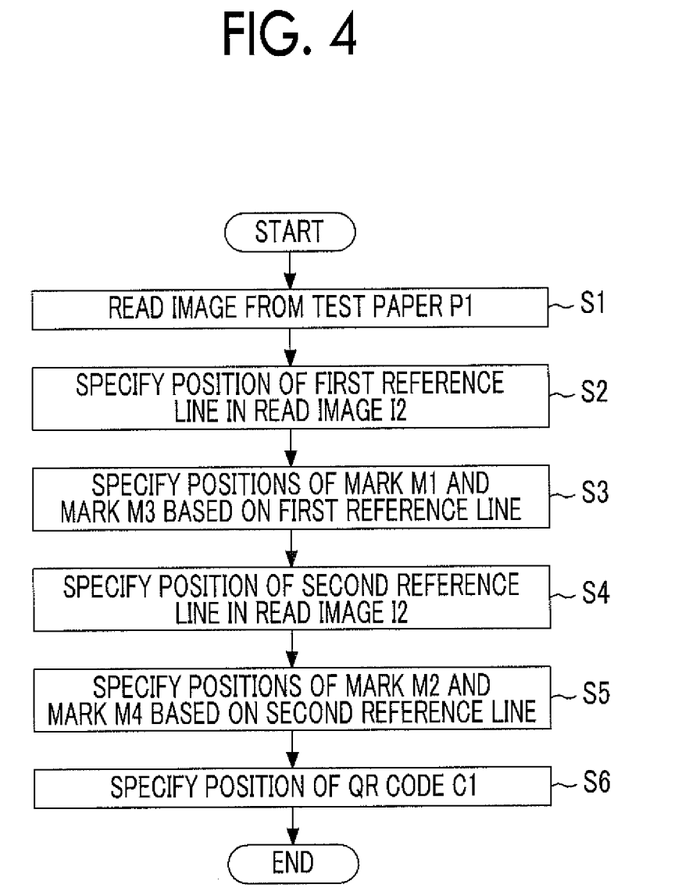
FIG. 4 is a view illustrating a process of specifying a position of a QR code by the image forming apparatus.

FIG. 4 is a view illustrating a process of specifying the position of the QR code by the image forming apparatus 1 in a case where the correction function is executed. The following process is initiated in a state in which a user outputs the test paper P1 from the image forming apparatus 1 in advance, and places the test paper P1 on the paper tray. For example, the output of the test paper P1 is triggered when the user manipulates the manipulation unit 103 and thus an instruction for formation of the test image is input. The user places the output test paper P1 on the paper tray. The test paper P1 may be placed on the paper tray in any direction. A guide member, which stabilizes a direction of the paper transported by the transport unit 105, is provided on the paper tray. The guide member slides in a width direction (direction perpendicular to a direction in which the paper is transported by the transport unit 105) of the paper stacked on the paper tray. The user slides the guide member in alignment with a width of the test paper P1 stacked on the paper tray. Hereinafter, a description will be given to a case where the test paper P1 is placed on the paper tray to be transported in a direction of an arrow A1 in FIG. 3 as an example.

In step S1, the control unit 101 reads an image from the test paper P1 stacked on the paper tray. The reading of the test paper P1 is triggered, for example, when the user manipulates the manipulation unit 103, and an instruction (hereinafter, referred to as a "reading initiation instruction") for initiation of the reading of the test paper P1 is input. When the reading initiation instruction is input, the transport unit 105 transports the test paper P1 toward the image reading unit 106, and the image reading unit 106 reads an image from the test paper P1. When the test paper P1 is transported in a state in which the guide member on the paper tray is aligned with the width of the test paper P1, the broken line B1 shown in FIG. 3 is read at a specific position (for example, the central point in the main-scanning direction of the light source of the image reading unit 106, and hereinafter, referred to as a "reference point") in the image reading unit 106. The control unit 101 stores image data indicating a read image in the storage unit 102.

Figure 5:
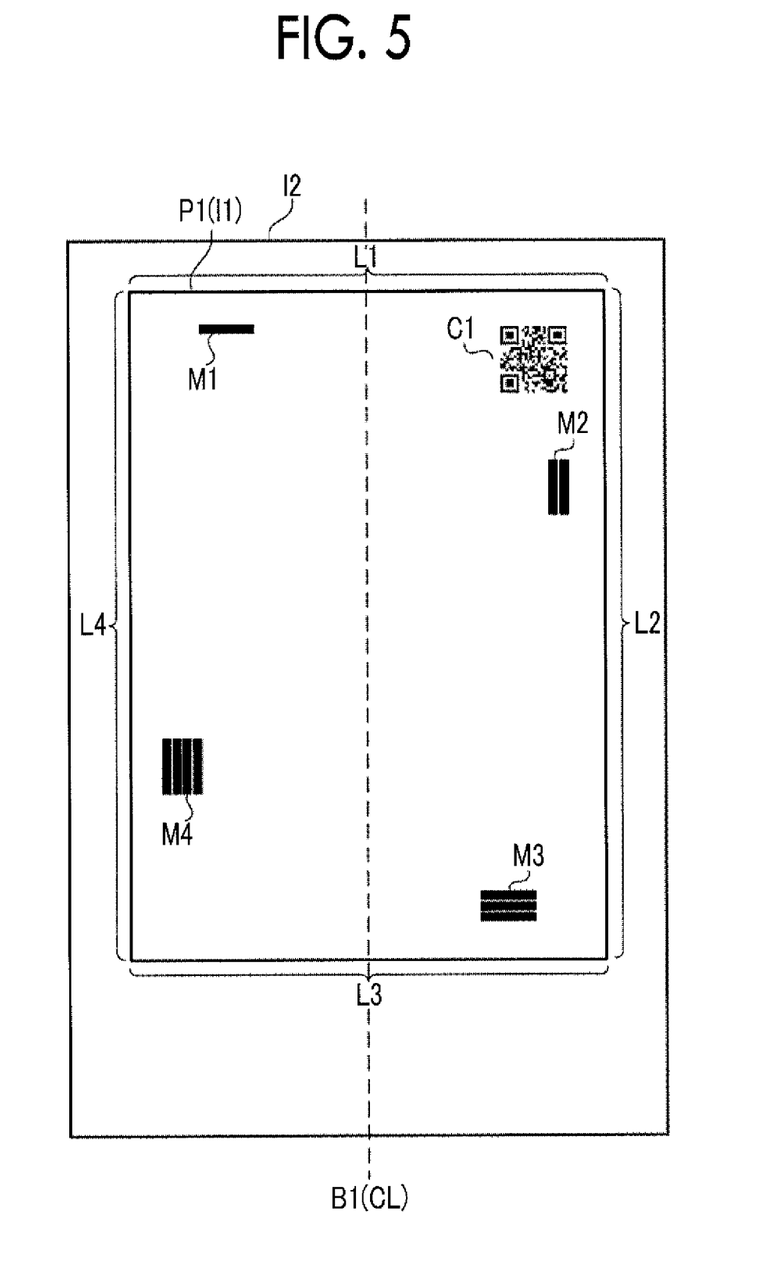
FIG. 5 is a view illustrating a read image.

FIG. 5 is a view illustrating a read image I2. With regard to the correction function, the control unit 101 specifies ends (the short side L1, the long side L2, the short side L3, and the long side L4) of the test paper P1 and a position of the test image I1 from the read image I2, and detects positional deviation of an image by a positional relationship between the ends of the test paper P1 and the test image I1. Accordingly, the control unit 101 reads an image in a size (for example, a maximum size) that is determined in advance in order for the ends of the test paper P1 to be included in the read image I2. In an example illustrated in FIG. 5, the guide member on the paper tray is aligned with the width of the test paper P1, and thus the central line (here, the broken line B1) of the test paper P1 is aligned to be superimposed on a central line CL of the read image. In addition, even when the test paper P1 has any size, and the test paper P1 is placed on the paper tray in any direction, if the guide member on the paper tray is aligned with the width of the test paper P1, the central line (the broken line B1 or the broken line B2) of the test paper P1 and the central line CL of the read image are aligned with each other to be superimposed on each other.

Refer to FIG. 4 again. In step S2, the control unit 101 specifies a position of a first reference line in the read image I2. Specifically, the control unit 101 specifies a position of a straight line, which passes through a point read at the reference point of the image reading unit 106 in the read image I2, as a position of the first reference line. In the above-described example, when the test paper p1 is transported in the direction of the arrow A1 (refer to FIG. 3) and an image is read, the control unit 101 specifies a position of the broken line B1 (FIG. 3) as a position of the first reference line.

In step S3, the control unit 101 specifies positions of the mark M1 (an example of a first mark) and the mark M3 (an example of a third mark) with respect to the read image I2 based on the first reference line. Specifically, the control unit 101 searches for a position with the distance d from the first reference line, and specifies coordinates of the mark M1 and the mark M3 in the read image I2. In addition, in this exemplary embodiment, the coordinates of each of the marks are coordinates of a point, which is determined in advance, on the mark, and represents, for example, coordinates of the center of gravity of the mark. The control unit 101 stores the specified coordinates in the RAM.

Figure 6:
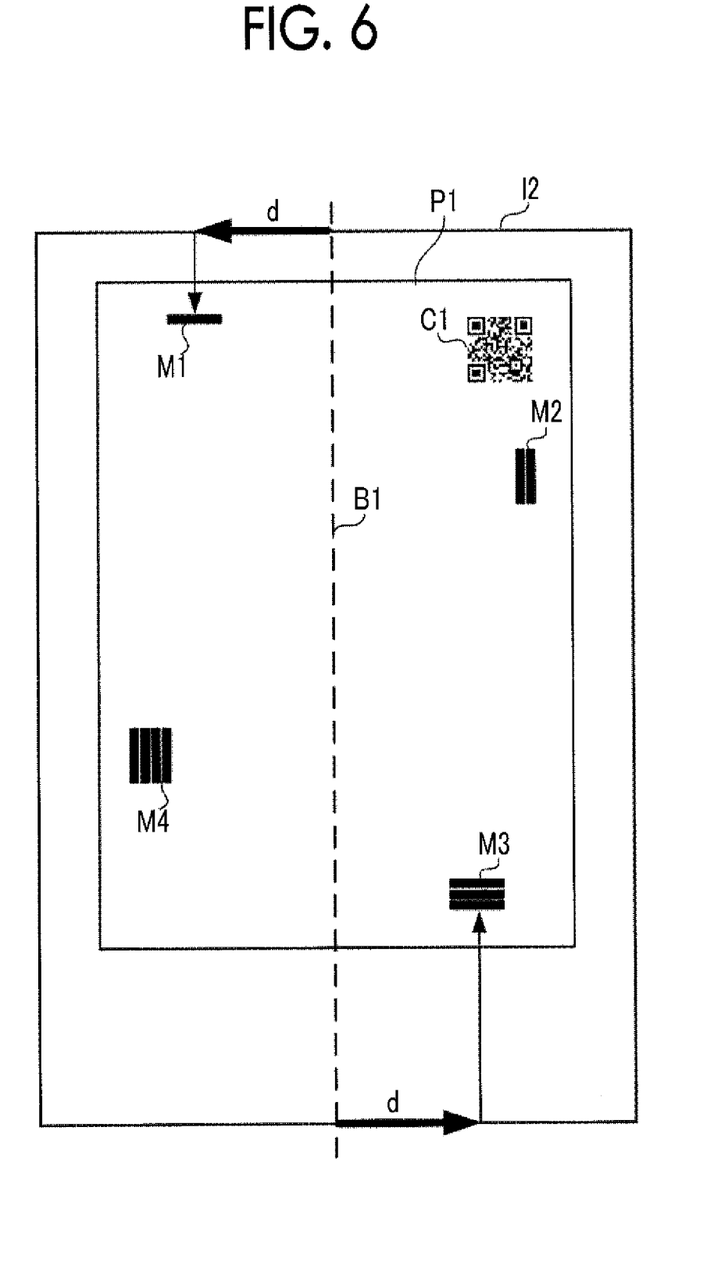
FIG. 6 is a view illustrating a process of specifying a position of a mark.

FIG. 6 is a view illustrating a process of specifying positions of the mark M1 and the mark M3 by the control unit 101. In FIG. 6, the control unit 101 searches a point with the distance d from the first reference line (in this example, the broken line B1) in a counter clockwise direction from a front end of the read image I2 toward a rear end of the read image I2, and specifies coordinates of the mark M1. In addition, the control unit 101 searches a point with the distance d from the first reference line in the counter clockwise direction from the rear end of the read image I2 toward the front end of the image I2, and specifies coordinates of the mark M3.

Refer to FIG. 4 again. In step S4, the control unit 101 specifies a position of a second reference line in the read image I2. Specifically, the control unit 101 calculates the middle point (that is, coordinates of the point p5 shown in FIG. 3) of a line segment that connects the coordinates of the mark M1 and the coordinates of the mark M3, and specifies a position of a straight line, which passes through the middle point and is perpendicular to the first reference line, as a position of the second reference line. In the above-described example, when the test paper P1 is transported in a direction of the arrow A1 (refer to FIG. 3) and an image is read, the control unit 101 specifies a position of the broken line B2 (FIG. 3) as the position of the second reference line.

In step S5, the control unit 101 specifies positions of the mark M2 (an example of a second mark) and the mark M4 (an example of a fourth mark) with respect to the read image I2 based on the second reference line. Specifically, the control unit 101 searches a position with the distance d from the second reference line, and specifies coordinates of the mark M2 and the mark M4 in the read image I2. The control unit 101 stores the specified coordinates in the RAM.

Figure 7:
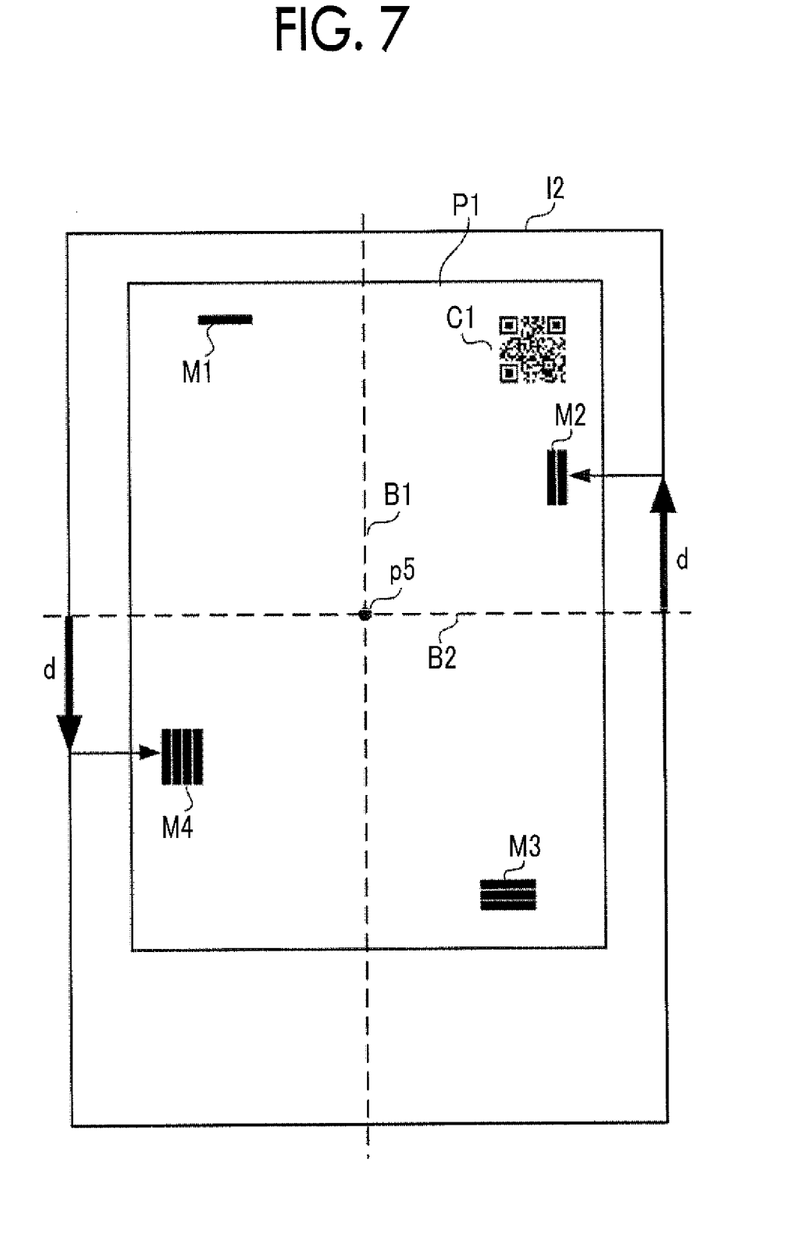
FIG. 7 is a view illustrating a process of specifying a position of a mark.

FIG. 7 is a view illustrating a process of specifying positions of the mark M2 and the mark M4 by the control unit 101. In FIG. 7, the control unit 101 searches a point with the distance d from the second reference line (in this example, the broken line B2) in a counter clockwise direction from a right side end of the read image I2 toward a left side end of the read image I2 in a width direction of the read image I2, and specifies coordinates of the mark M2. In addition, the control unit 101 searches a point with the distance d from the second reference line in the counter clockwise direction from the left side end of the read image I2 toward the right side end of the read image I2 in the width direction of the read image I2, and specifies coordinates of the mark M4.

Refer to FIG. 4 again. In step S6, the control unit 101 specifies a position of the QR code C1. Specifically, information indicating a positional relationship between the mark M and the QR code is stored in the storage unit 102. The control unit 101 specifies coordinates of the QR code C1 by using the information and coordinates of the marks M which are stored in the RAM. In the above-described example, the control unit 101 searches a position that is determined with respect to the mark M1 and the mark M2, and specifies the coordinates of the QR code C1. In addition, the coordinates of the QR code C1 are coordinates of a point, which is determined in advance, on the QR code C1, and represent, for example, coordinates of the center of gravity of the QR code C1. The control unit 101 stores the specified coordinates in the RAM.

According to the above-described processes, the control unit 101 specifies the positions of the marks M, and specifies the position of the QR code C1 based on the positions of the marks M. Accordingly, when the control unit 101 specifies the position of the QR code with respect to the read image I2, a processing burden is reduced in comparison to a case where the marks M are not included in the test image. In addition, even when the test paper P1 is placed on the paper tray in any direction, the same process as the process shown in FIG. 4 is performed, and thus the position of the QR code is specified.

The invention is not limited to the above-described exemplary embodiment, and various modifications may be made. Hereafter, several modification examples will be described. Two or more of the following modification examples may be combined and used.

The direction in which the test paper P1 is transported with respect to the image reading unit 106 is not limited to the direction of the arrow A1. The test paper P1 may be transported in a direction opposite to the arrow A1. In addition, the test paper P1 may be transported in such a manner that the long side L2 or L4 of the test paper P1 becomes the front end. In a case where the test paper P1 is transported in such a manner that the long side L2 or L4 becomes the front end, in step S2, the control unit 101 specifies the position of the broken line B2 as the position of the first reference line. In step S3, the control unit 101 specifies the positions of the mark M2 and the mark M4. In addition, in step S4, the control unit 101 specifies the position of the broken line B1 as the position of the second reference line. In step S5, the control unit 101 specifies the positions of the mark M1 and the mark M3.

The code image is not limited to the QR code. The code image may be other two-dimensional codes such as PDF417, a communication platform (CP) code, and a high capacity color barcode (HCCB) as long as the two-dimensional codes are images indicating information for correction of the position of the image by the image forming apparatus 1. In addition, the code image may be a one-directional code.

The information indicated by the code image is not limited to the information described in the exemplary embodiment. For example, with regard to the correction function, in a case where the test image is continuously formed across plural sheets of paper, the code image may indicate the order of the test paper (that is, the sequence of the paper on which the test image is formed). In addition, the code image may indicate a temperature and humidity inside the image forming apparatus 1 when the test image is formed. In addition, with regard to the correction function, in a case where the test image is formed on plural sheets of paper accommodated in accommodation portions different from each other, the code image may indicate information for identification of an accommodation portion in which the corresponding paper is accommodated. In addition, the code image may indicate information other than information for correction of the position of the image by the image forming apparatus 1.

The test image is not limited to the image described in the exemplary embodiment. For example, the mark M1 to the mark M4 may not be formed by the line segment. As another example, the mark M1 to the mark M4 may have the same shape. In this case, for example, the QR code C1 may be provided to be superimposed on a side of a rectangle that passes through the coordinates of the mark M1 to the mark M4.

It is not necessary for the four marks to be provided to the test image. For example, two marks, which include a mark provided in correspondence with a short side of the test paper and a mark provided in correspondence with a long side, may be included in the test image. In this case, the control unit 101 searches a position that is determined with respect to the two marks and specifies the coordinates of the QR code C1. As still another example, five or more marks may be included in the test image. In addition, the position at which the QR code C1 is provided is not limited to the position described in the exemplary embodiment.

The reference point is not limited to the central point in the main-scanning direction of the light source of the image reading unit 106. For example, the reference point may be present at one side of the ends in the main-scanning direction of the light source of the image reading unit 106. In this case, the transport unit 105 transports the test paper P1 in such a manner that the end (the short side L1, the long side L2, the short side L3, or the long side L4) of the test paper P1 passes through the reference point of the image reading unit 106. In addition, in this case, the mark M1, the mark M2, the mark M3, and the mark M4 are provided at positions with the distance d determined from the long side L4, the short side L1, the long side L2, and the short side L3, respectively, and the position of the QR code C1 is specified based on the positions of the mark M1 to M4 which are specified from the read image.

The hardware configuration of the image forming apparatus 1 is not limited to the configuration shown in FIG. 1. The image forming apparatus 1 may have any hardware configuration as long as the processes in respective steps shown in FIG. 4 may be executed.

In this exemplary embodiment, the correction program that is executed by the image forming apparatus 1 is provided in a state of being stored in a computer-readable storage medium such as a magnetic storage medium (a magnetic tape, a magnetic disk (a HDD, a flexible disk (FD)), and the like), an optical storage medium (an optical disk (compact disk (CD), a digital versatile disk (DVD)), and the like), a magneto-optical storage medium, and a semiconductor memory (a flash ROM and the like). In addition, the program may be downloaded through a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:
   an image forming unit that forms a test image for correction of a position of an image, which is formed on a recording medium, on the recording medium;
   a reading unit that reads an image from the recording medium on which the test image is formed;
   a transport unit that transports the recording medium, on which the test image is formed, with respect to the reading unit in order for a first reference line set with respect to the recording medium to be read at a specific position in the reading unit; and a correction unit that corrects the position of the image, which is formed on the recording medium by the image forming unit, using an image that is read by the reading unit, wherein the test image includes:

a first mark that is provided at a position at a distance determined from the first reference line in correspondence with a first side of the recording medium;

a second mark that is provided at a position at the distance from a second reference line set with respect to a second side in correspondence with the second side that comes into contact with the first side;

a third mark corresponding to a third side that comes into contact with the second side of the recording medium;

a fourth mark corresponding to a fourth side that comes into contact with the first side; and a code image that is provided at a position determined based on the positions of the first mark and the second mark, and that indicates information for correction of the position of the image by the correction unit, wherein the first mark, the second mark, the third mark, and the fourth mark, which are included in the test image, have shapes different from each other.

2. The image forming apparatus according to claim 1, wherein the third mark is provided at the distance from the first reference line, and the fourth mark is provided at the distance from the second reference line.

3. The image forming apparatus according to claim 1, wherein the position of the first mark and a position of the third mark are point-symmetric about a point at which the first reference line and the second reference line intersect each other.

4. The image forming apparatus according to claim 2, wherein the position of the first mark and a position of the third mark are point-symmetric about a point at which the first reference line and the second reference line intersect each other.

5. The image forming apparatus according to claim 1, wherein the position of the second mark and a position of the fourth mark are point-symmetric about the point at which the first reference line and the second reference line intersect each other.

6. The image forming apparatus according to claim 2, wherein the position of the second mark and a position of the fourth mark are point-symmetric about the point at which the first reference line and the second reference line intersect each other.

7. The image forming apparatus according to claim 3, wherein the position of the second mark and a position of the fourth mark are point-symmetric about the point at which the first reference line and the second reference line intersect each other.

8. The image forming apparatus according to claim 4, wherein the position of the second mark and a position of the fourth mark are point-symmetric about the point at which the first reference line and the second reference line intersect each other.

9. A non-transitory computer-readable storage medium storing a program configured to:

form a test image for correction of a position of an image, which is formed on a recording medium, on the recording medium;

read an image from the recording medium on which the test image is formed;

transport the recording medium, on which the test image is formed, in order for a first reference line set with respect to the recording medium to be read at a specific position; and correct the position of the image, which is formed on the recording medium, using an image that is read, wherein the test image includes:

a first mark that is provided at a distance determined from the first reference line in correspondence with a first side of the recording medium;

a second mark that is provided at the distance from a second reference line set with respect to a second side in correspondence with the second side that comes into contact with the first side;

a third mark corresponding to a third side that comes into contact with the second side of the recording medium;

a fourth mark corresponding to a fourth side that comes into contact with the first side; and a code image that is provided at a position determined with respect to the first mark and the second mark, and that indicates information for correction of the position of the image, wherein the first mark, the second mark, the third mark, and the fourth mark, which are included in the test image, have shapes different from each other.

* * * * *